United States Patent
Dress

(10) Patent No.: US 11,418,593 B2
(45) Date of Patent: Aug. 16, 2022

(54) READ-COHERENT GROUP MEMORY

(71) Applicant: Lightfleet Corporation, Camas, WA (US)

(72) Inventor: William Dress, Camas, WA (US)

(73) Assignee: Lightfleet Corporation, Camas, WA (US)

( * ) Notice: Subject to any disclaimer, the term of this patent is extended or adjusted under 35 U.S.C. 154(b) by 0 days.

(21) Appl. No.: 17/248,638

(22) Filed: Feb. 1, 2021

(65) Prior Publication Data

US 2021/0160321 A1    May 27, 2021

Related U.S. Application Data

(63) Continuation-in-part of application No. 16/799,774, filed on Feb. 24, 2020, now Pat. No. 11,228,458, which is a continuation-in-part of application No. 15/262,391, filed on Sep. 12, 2016, now abandoned, application No. 17/248,638, which is a continuation
(Continued)

(51) Int. Cl.
| | |
|---|---|
| *H04L 67/1097* | (2022.01) |
| *H04L 49/15* | (2022.01) |
| *H04L 49/356* | (2022.01) |
| *G06F 12/0817* | (2016.01) |
| *G06F 3/06* | (2006.01) |
| *G06F 13/28* | (2006.01) |
| *G06F 13/40* | (2006.01) |
| *H04L 67/104* | (2022.01) |
| *H04L 67/1095* | (2022.01) |
| *H04L 12/40* | (2006.01) |
| *H04L 67/10* | (2022.01) |
| *H04L 12/18* | (2006.01) |

(52) U.S. Cl.
CPC ......... *H04L 67/1097* (2013.01); *G06F 3/061* (2013.01); *G06F 3/065* (2013.01); *G06F 3/067* (2013.01); *G06F 12/0817* (2013.01); *G06F 13/28* (2013.01); *G06F 13/4068* (2013.01); *H04L 12/40163* (2013.01); *H04L 49/15* (2013.01); *H04L 49/357* (2013.01); *H04L 67/10* (2013.01); *H04L 67/104* (2013.01); *H04L 67/1095* (2013.01); *H04L 12/1881* (2013.01)

(58) Field of Classification Search
CPC . H04L 67/1097; H04L 49/357; H04L 67/104; H04L 67/1095; H04L 12/40163; H04L 67/10; H04L 49/15; H04L 12/1881; G06F 12/0817; G06F 3/061; G06F 3/065; G06F 3/067; G06F 13/28; G06F 13/4068
See application file for complete search history.

(56) References Cited

U.S. PATENT DOCUMENTS

| | | | |
|---|---|---|---|
| 6,594,736 B1 * | 7/2003 | Parks | G06F 12/0815 709/217 |
| 9,684,597 B1 * | 6/2017 | Eiriksson | G06F 12/0815 |

(Continued)

*Primary Examiner* — Brian Whipple
*Assistant Examiner* — James Ross Hollister
(74) *Attorney, Agent, or Firm* — Schultz & Associates, P.C.

(57) ABSTRACT

A data distribution system includes a data distribution module and at least two host-bus adapters coupled to the data distribution module. The data distribution system includes a memory-management system including a plurality of memory regions. The memory-management system is coherent across the plurality of memory regions and an absolute address of each of the plurality of memory regions accessed by a same offset.

8 Claims, 1 Drawing Sheet

Related U.S. Application Data of application No. 15/262,402, filed on Sep. 12, 2016, now abandoned, said application No. 16/799,774 is a continuation-in-part of application No. 15/175,685, filed on Jun. 7, 2016, now abandoned.

(60) Provisional application No. 62/241,112, filed on Oct. 13, 2015, provisional application No. 62/217,001, filed on Sep. 10, 2015, provisional application No. 62/217,003, filed on Sep. 10, 2015, provisional application No. 62/216,999, filed on Sep. 10, 2015, provisional application No. 62/217,004, filed on Sep. 10, 2015.

(56) References Cited

U.S. PATENT DOCUMENTS

| | | | |
|---|---|---|---|
| 2004/0117562 A1* | 6/2004 | Wu | G06F 12/0866 711/147 |
| 2008/0091884 A1* | 4/2008 | Piry | G06F 12/0831 711/141 |
| 2009/0292886 A1* | 11/2009 | Shrader | G06F 13/1668 711/158 |
| 2011/0004732 A1* | 1/2011 | Krakirian | G06F 12/0817 711/147 |
| 2012/0117312 A1* | 5/2012 | Chan | G06F 3/0653 711/103 |
| 2013/0275699 A1* | 10/2013 | Cheriton | G06F 12/00 711/162 |
| 2013/0339600 A1* | 12/2013 | Shah | H04L 67/1097 711/114 |
| 2014/0044430 A1* | 2/2014 | Dress | H04B 10/801 398/66 |
| 2014/0136776 A1* | 5/2014 | Elkington | G06F 3/0604 711/113 |
| 2015/0186057 A1* | 7/2015 | Das Sharma | G06F 12/1081 714/6.3 |
| 2015/0186215 A1* | 7/2015 | Das Sharma | G06F 15/16 714/6.23 |

* cited by examiner

READ-COHERENT GROUP MEMORY

CROSS-REFERENCE TO RELATED APPLICATIONS

This application is a continuation of U.S. application Ser. No. 15/262,402 filed Sep. 12, 2016, which claims priority benefit from U.S. Provisional Application No. 62/241,112 filed on Oct. 13, 2015, and U.S. Provisional Application No. 62/216,999 filed on Sep. 10, 2015, and U.S. Provisional Application No. 62/217,001 filed on Sep. 10, 2015, and U.S. Provisional Application No. 62/217,003 filed on Sep. 10, 2015 and U.S. Provisional Application No. 62/217,004 filed on Sep. 10, 2015. This application is also a continuation-in-part of U.S. application Ser. No. 16/799,774 filed on Feb. 24, 2020, which is a continuation-in-part of U.S. application Ser. No. 15/175,685 filed on Jun. 7, 2016 [now abandoned] and is a continuation-in-part of U.S. application Ser. No. 15/262,391 filed on Sep. 12, 2016 [now abandoned]. The patent applications identified above re incorporated here by reference in its entirety to provide continuity of disclosure.

BACKGROUND OF THE INVENTION

An early implementation of multicomputer systems used a shared memory wherein each endpoint had access to the same physical memory. A shared memory serving more than a few endpoints becomes both very expensive and highly inefficient. Today's multicomputer systems are based on collections of individual servers or endpoints, each with its own complement of memory, effectively rendering the use of shared memory ineffective in systems supporting of many endpoints. The management of a distributed, mirrored memory then becomes one of maintaining identical copies of local memory across the entire cooperating group (which may include all of the endpoints) and granting access in a manner to maintain system-wide memory consistency and coherency. Consistency requires a method to ensure that read access by any group member at any time returns the same result. Such coordination usually requires a mechanism of semaphores and locks to prevent access to local copies until such time that the entire set of mirrored copies is guaranteed to be consistent.

SUMMARY OF THE INVENTION

There is a need for the following embodiments of the present disclosure. Of course, the present disclosure is not limited to these embodiments.

According to an embodiment of the present disclosure, a method comprises operating a data distribution system including initializing a memory-management system that is coherent across a plurality of memory regions; and accessing an absolute address of each of the plurality of memory regions by a same offset. According to another embodiment of the present disclosure, an apparatus comprises: a data distribution system including a data distribution module and at least two host-bus adapters coupled to the data distribution module, wherein the data distribution system includes a memory-management system including a plurality of memory regions, wherein the memory-management system is coherent across the plurality of memory regions and wherein an absolute address of each of the plurality of memory regions accessed by a same offset.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein. It should be noted that the features illustrated in the drawings are not necessarily drawn to scale.

DETAILED DESCRIPTION OF THE INVENTION

Figure 1:
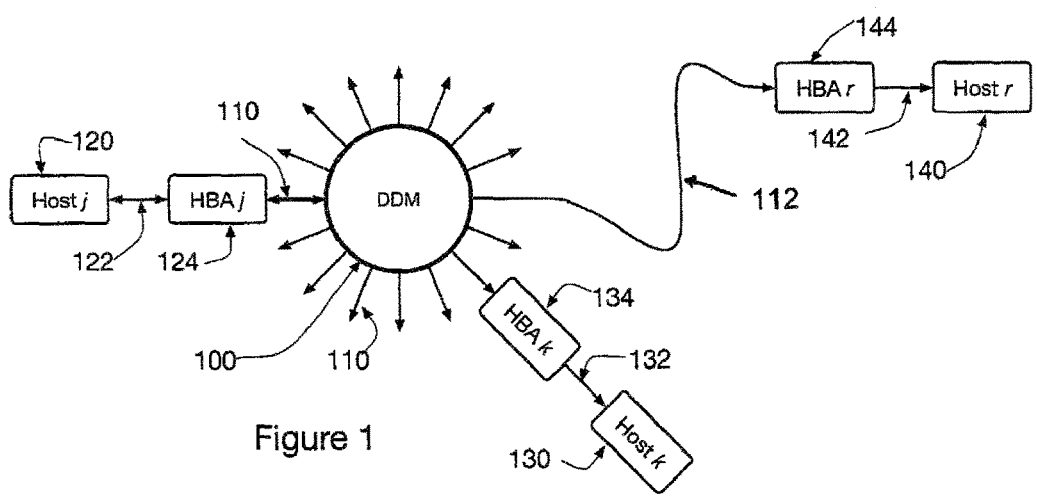
FIG. 1 illustrates a cluster of loosely coupled computing or storage or network elements.

The invention relates generally to the field of methods and devices for providing coherent memory access across a network of interconnected computers or host devices.

The invention presented in this disclosure is based on the interconnect or data-distribution system (DDS) described in U.S. Provisional Application No. 62/216,999, filed Sep. 10, 2015 and U.S. application Ser. No. 15/175,685, filed Jun. 7, 2016 and allows a simple, unique, and efficient implementation of a coherent group memory without any additional hardware. The concept, which may also be called "virtual shared memory", is based on the unique multicast mechanism inherent in the DDS, which can include a data-distribution module (DDM) with host-bus adapters (HBAs) mediating between hosts and the DDM. Each HBA connects a host (server, local computing station, memory system, etc.) to the DDM as described in the referenced application. The resulting DDS may be seen as either a tightly coupled cluster of computational resources or as a distributed system supporting remote hosts as well as local hosts referenced to the transmitting host. The DDS may include a single DDM with HBAs or a fabric of interconnected DDMs where each DDM connects to local hosts via their HBAs and to other DDMs in the fabric.

A fundamental requirement for coherent memory applications is to allow each part of the system access to the same information. That is, each part of the system must have an identical view of any shared information. The obvious way to achieve this goal is by means of a single shared and unique memory. For a computing cluster including many different elements or processing centers, both accessing and maintaining coherence of such a shared memory becomes untenable, especially when the constraint of consistency is enforced.

System architecture for today's installations is based on multiple heterogeneous or homogeneous servers, blades, or locations each with its own memory assets. These elements are interconnected by switches and routers, or, in the case of the DDS, by one or more DDMs through the attached HBAs. The problem then becomes one of implementing a memory-management system that is coherent across multiple and possibly heterogeneous memory regions that may be separated by large distances.

The following sections describe how to achieve a coherent view of a memory mirrored across multiple stations. The physical memory in the DDS is distributed but each defined group has an assigned memory area that, while physically mirrored across all group members, is accessed as if it were a single memory asset shared by the entire group.

"Coherence" in the context of this disclosure means that, for any memory access by any group member, the access will either read or write the same information from or to the same relative memory location. That is, the memory distributed across an entire group is consistent during any read by any particular group member. The distributed copies of memory belonging to a particular group are also called "mirrored" memory regions. Ideally, coherence would be temporal, however since mirrored copies may reside at widely separated locations, strict temporal coherence is not possible within the access-time granularity of modern memory systems. The management process then becomes one of ensuring that memory access is logically coherent.

This disclosure describes a hardware implementation of read-coherent access to mirrored data regions initially defined by allocating the same-sized block of memory in each host supporting a member of the group in question and maintaining such coherence by the methods disclosed below. The physical location (absolute address) of these mirrored regions may vary from host to host and are accessed by the same offset from possibly different base addresses.

FIG. 1 illustrates the architecture of a DDS cluster where hosts 120, 130, and 140 connect to HBAs 124, 134, and 144 via bidirectional connections 122, 132 and 142, respectively. DDM 100 is the interconnect that allows all hosts (120, etc.) to communicate with each other via their attached HBAs (124, etc.). Local hosts, shown by example 120 and 130, are connected to their local HBAs, shown by example 124 and 134 which, in turn, are connected to DDM 100 by means of local bidirectional connections 110. Remote hosts, for example host r 140, are served by remote adapters, such as HBA r 144, which is connected to DDM 100 via remote, bidirectional connections such as connection 112. Multiple connections to DDM 100 are shown in the figure where each connection may be local 110 or remote 112, where "local" refers to a host or HBA residing in the same rack or cabinet and "remote" refers to a host or HBA residing at a remote location in another cabinet, room, building or city.

Referring to FIG. 1, host j 120 requests a read from its local memory corresponding to a group m by sending a read request to DDM 100 via connection 122 to HBA j 124 via connection j 110, where j is an index referring to the DDM input channels and, by implication, to the attached HBAs, hosts, and connections. The read request is then granted by DDM 100 under certain conditions described below and the grant is sent back to host j 120 by means of a fast priority control message over the same path (to the HBA 120 via connections 110 and 122). Any other hosts such as 130 and 140 may also make read requests that arrive at DDM 100 at the same or different times.

Each host that supports group m has a copy of the mirrored memory for group m. All such copies are allocated at group initialization and maintained by the group-update process. Any member of group m (where m stands for any group including the group of all hosts) may update its group memory, which is independent of the memory allocated to any other group. The update process involves, for example, group member j residing in host j 120 and belonging to group m issuing a write command to its own local copy that is physically located in host j 120 (the local memory is not updated at this time). The operating system or kernel in host j 120 manages the write process by broadcasting the data comprising the write to all members of group m (including to host j 120 itself). The multicast process ensures that the data packets containing identical copies of the relevant information exit DDM 100 in a simultaneous fashion and thereby reach all local HBAs at nearly the same time. HBAs residing in different racks other than the sending HBA, such as remote HBA r 144, will receive the update with some amount of delay consistent with the physical distance from DDM 100.

Figure 2:
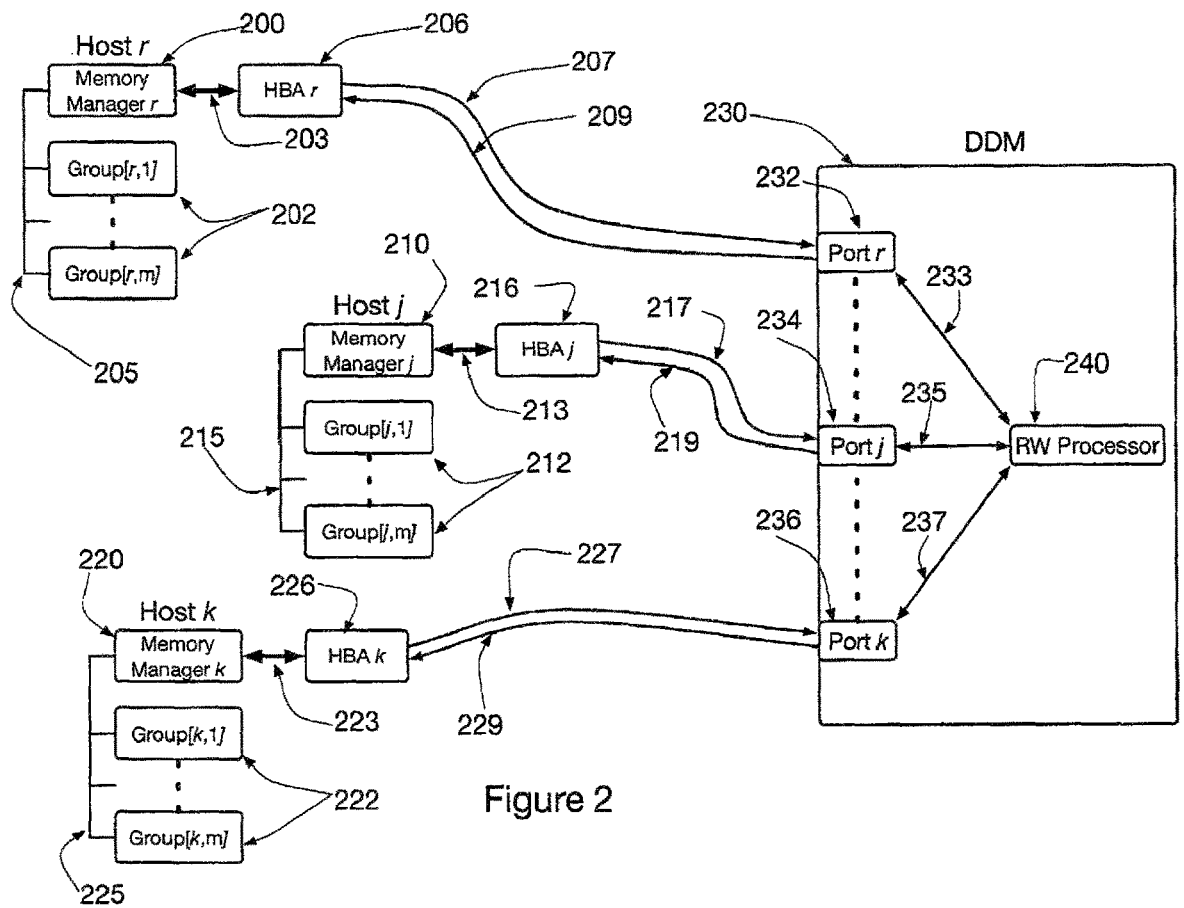
FIG. 2 depicts the process of managing coherent memory for various groups by coordination within a data distribution module (DDM).

The memory-access mechanism for maintaining coherent access to all mirrored copies of each group's memory, thus ensuring that each group's memory may be treated logically as a shared memory, is explained by FIG. 2, which illustrates the communication process and the DDM mechanism needed to support an update.

Referring to FIG. 2, a write or memory update is issued by host j 120 by means of memory manager j 210 originating from a local member of group m. DDM 100 always allows write commands to proceed. Any read-write conflict is resolved at by the host memory manager 200, etc. Memory manager j 210 sends a memory-update command along with the data comprising the update to all members of group m, no matter where they reside in the distributed system of hosts. This update is sent over connection 213, received and processed by HBA j 216, which prepares a data packet as described in U.S. Provisional Application No. 62/216,999, filed Sep. 10, 2015 and U.S. application Ser. No. 15/175, 685, filed Jun. 7, 2016 for multicast to all members of group m, including connections 203 and 223 supposing the connected host support group m. This packet goes out on connection 217 to DDM 230 where it is received by input processor port j 234. Port j 234 sends any write commands and read requests to RW processor 240 via connection 235. Similarly, updates received by any of the n ports, such as ports 232, 234, and 236 via their connections such as 233, 235, and 237, respectively, are sent to DDM 230 via connections 207, 217, and 227, respectively.

Since neither read nor write (update) requests are queued in DDM 230, host-local memory manager 200, etc. may allow only a single read and write request at a time from any group to be processed (sent to the DDM). These requests are locally queued in the memory managers by group and are indicated by group[a,b] 202, 212 and 222, as well as others not shown, where a ranges over the number of hosts and b ranges over the number of groups in a local host. Read requests are removed from the head of the queue and the queue is prevented from advancing until the pending read request has been granted. Similarly, the local write-request queue is advanced to the next location when a notification of the update has been received from the HBA. This simple process needs no illustration as it is well understood by practitioners of the art of memory management and queuing.

Suppose that host k 130 is a member of group m. HBA k 134 will then receive and process the update via a direct-memory access (DMA) based on the offset disclosed in U.S. Provisional Application. No. 62/216,999, filed Sep. 10, 2015 and U.S. application Ser. No. 15/175,685, filed Jun. 7, 2016 by writing directly into the specified location for the update in the mirrored memory area allocated for group m in host k 130. Host k 130 is then notified by HBA k 134 (typically by sending an interrupt to the host) that a memory update has occurred. During the notification process, HBA k 134 responds to the update by sending an acknowledgement (ACK) back to DDM 100 via a connection 110. The same connection, labeled 227 in FIG. 2 shows that the ACK enters port k 236 where it is directed to the RW processor 240. This process is disclosed in more detail below. The acknowledgement is in the form of a fast priority message as described in disclosure U.S. Provisional Application No. 62/216,999, filed Sep. 10, 2015 and U.S. application Ser. No. 15/175,685, filed Jun. 7, 2016 and contains information on the group index m and the source of the message j. Any other hosts containing members of group m, such as remote memory manager r 140 by means of HBA r 144 over connection 142, are similarly notified when the update data arrive in their mirrored group memories.

Referring again to FIG. 2, a read request for group m made by memory manager j 210 is sent to HBA j 216 via connection 213. HBA j 216 receives and processes the request, sending a fast priority message via connection 217 to DDM 230 where it is processed by input processor port j 234. The index j and group index m are then sent to RW processor 240 as described above.

Figure 3:
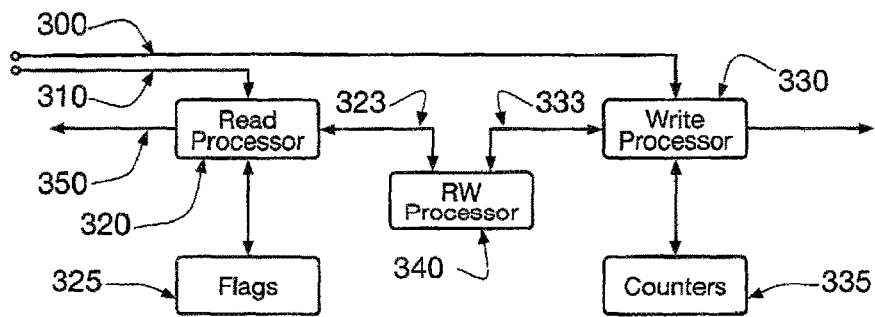
FIG. 3 depicts the internal process of granting read requests and tracking updates for each group.

Referring to FIG. 3, connection 235 of FIG. 2 now represented by connection 310 in FIG. 3 which conveys the read request to read processor 320. Connection 310 represents the jth one of n such connections, one from each of the n DDM input ports 232, etc. Read processor 320 accesses the read-flags table flags 325 by means of indices {m,j} specifying, by way of example, the mth row and jth column of flags table 325. If the flag at position {m,j} is zero, the read processor immediately grants the read request by sending a fast-priority message via connection 350, which refers to connection 235 of FIG. 2. The fast-priority message is transmitted by port 234 to the requesting HBA j 216 via line 219. Memory manager 210 is then notified via connection 213. The pending request (see above) in the host memory manager r 200, j 210, or k 220, by way of example, is removed by advancing the request queue in the memory manager and the read from group[j,m] mirrored memory is allowed to proceed by notification via connection 215 (as well as 205 and 225, by way of example).

If flag in table flags 325 at position {m,j} is not zero, the request has been marked "pending" and is not granted. The read request in memory manger j 210 is not honored and remains a pending read until such time that it is granted.

Referring to FIG. 2, an update command for group m made by memory manager j 210 is sent to HBA j 216 via connection 213. HBA j 216 receives and processes the update by sending a header that precedes the update data. The header contains the group index m and an offset into the mirrored memory group[a,m] for all members of the group. The packet including the header, the update data, and an end-of-packet frame are sent to DDM 230 via connection 217 to input processor port j 234, which sends the packet on through DDM 230 as disclosed in U.S. Provisional Application No. 62/216,999, filed Sep. 10, 2015 and U.S. application Ser. No. 15/175,685, filed Jun. 7, 2016 as a multicast transmission to all members of group m. The group index m and the port index j are sent via connection 235 to RW processor 240 along with an integer cnt specifying the number of members in group m. This integer, obtained from the exit-port map extracted from row m of the subscription table in U.S. Provisional Application No. 62/216,999, filed Sep. 10, 2015 and U.S. application Ser. No. 15/175,685, filed Jun. 7, 2016, specifies the number of members in group m.

Referring again to FIG. 3, the group index m, the port index j, and the integer cnt arrive at write processor 330 via connection 300. Write processor 330 inserts the integer cnt into row m, column j in the table of counters in counters 335, which is necessarily zero since any memory manager such as 210 only allows a single update request to be issued, the others being queued as described above. A row counter (not shown), indexed by m, is incremented by cnt for each update received for group m. A non-zero entry in counters table 335 at location {m,j} indicates that a coherent-memory update is in progress for the specified group m from the specified host j. Multiple hosts may send update commands to the DDM either simultaneously or within any given time interval. They will all be honored and marked in counters table 335. However, only one update command per host per group may be outstanding at any given time as explained above.

As each participating HBA (such as HBA r 206, HBA j 216, and HBA k 226) receives its update for mirrored memory m, it sends an ACK back to the DDM through lines 209, 219, and 229, respectively, as described above. Each ACK is sent to write processor 330 via line 300 and processed there by decrementing the counter at location {m,g} where g is the index of the HBA sending the ACK. If the counter at position {m,g} reaches zero after cnt decrements, row counter m is decremented. If row counter m reaches zero, RW processor 340 is notified via connection 333. RW processor 340 then processes read-request flags 325 via connections 323 through read processor 320 to access flags 325. Each non-zero flag j in column m is cleared after triggering a fast priority message granting the read request. This grant message is sent directly to port j via connections 350 for each j so identified in the table row m in flags 325. In this way, all pending read requests for group m from anywhere in the DDS are granted once all updates for group m have completed. This ensures that any read request, at the time it is granted, will return the same information no matter which mirrored memory copy for group m is read and that the value returned will be up to date with the latest information. This holds even if one host made a request before an update was issued by another host. Thus, any virtual shared-memory read-access adhering to the process disclosed here is guaranteed to return the most recent update from any mirrored group memory no matter how widely distributed across the computing cluster the group may be.

Sole read processor 320 and write processor 330 serve all input n ports in the DDM. There are as many connections to read processor 320 and write processor 330 as there are input ports in the DDM.

Sole read processor 320 and write processor 330 serve all input n ports in the DDM. There are as many connections to read processor 320 and write processor 330 as there are input ports in the DDM.

In this disclosure, the function of the input processor is augmented over that previously disclosed in U.S. Provisional Application No. 62/216,999, filed Sep. 10, 2015 and U.S. application Ser. No. 15/175,685, filed Jun. 7, 2016 with the purpose of treating the specialized read requests and coherent updates by incorporating the mechanisms shown in FIG. 3 and the functions disclosed in DDM 230 in FIG. 2.

Mechanisms for dealing with missing connections, offline hosts and HBAs are included by implication in the management mechanism described above. These mechanisms are readily commercially available in the field of computer memory management and will be well understood by those familiar with the process of maintaining and accessing remote and local memory regions. As such, they do not need to be presented in this disclosure.

Multiple read requests or write commands by different hosts are handled by host-specific port managers 232, 234, 236 as well as the remaining managers not shown in FIG. 2. A group m may receive multiple simultaneous requests to read from or write to a specific memory location or area in different hosts (as indexed by port index r 232, port index j 234, and port index k 236 among others). These requests are managed by DDM 230 as are any other messages or priority requests as described in U.S. Provisional Application No. 62/216,999, filed Sep. 10, 2015 and U.S. application Ser. No. 15/175,685, filed Jun. 7, 2016. For example, full queues internal to DDM 230 are treated by high-priority flow-control messages in a manner consistent with the other internal queues. A "stop-sending" flow-control message will prevent the HBA from sending requests, and if its request queue fills, a further "stop-sending" message will demand that the host stop sending requests until such time as the queues have emptied and a "start sending" command is received.

Paging

With a single write counter in counters 335 for each group member and each of the n inputs of DDM 230 (or 100 in FIG. 1), the read-coherent access encompasses the entire mirrored memory for each group supported. A finer division of memory access that allows a quicker response to requests results from dividing group memory into a number of pages. The corresponding write counters 335 then require an entry for each page for each group. For example, allowing for two pages in each mirrored copy would double the size of the tables in flags 325 and in counters 335. Memory managers 200, 210, 220, etc. would also be required to support paging. The resulting system with multiple pages would mean that a pending read request or write command in one page would not affect a new read request or update command issued by another page.

The page size or number of pages per group should be specified at system initialization and there must be enough memory in the hosts and DDM to support the necessary tables for the memory management process.

Absolute Memory Coherency

Since the DDS serves a cluster that is possibly widely-distributed geographically, there is no truly valid and precise "universal time" mechanism available that could enforce temporal coherency. The IEEE 1588 clock-synchronization protocol comes close to providing such a universal time, but only at a granularity in the near sub microsecond range. Such temporal granularity is much longer than that involved in memory access, so it may not be adequate for all needs.

The method described in this disclosure may be said to provide an "absolute memory coherency" in the sense that any read access to a group following the above prescription must be requested before being granted. The grant only occurs after all outstanding updates to that group's mirrored memory copies have completed. Thus, any value read from a given relative location in any group at any particular instant of universal time will be the same even if the group members are widely distributed either geographically or temporally. The method then provides an absolute guarantee that any group memory access made anywhere in the cluster at a particular time to a specified location will return the same value and the value returned will be consistent with the latest memory update.

The cost of the above guarantee comes at the expense of waiting until all pending update commands have been carried out prior to any read requests being granted. This potential read-delay may not be consistent with the needs of certain applications where absolute consistency is not a requirement.

The absolute memory coherency offered by the disclosed method has associated costs that may outweigh the benefits in certain situations. For example, a high frequency of local reads can generate a large number of requests (and responses) potentially slowing down a local computation. Such a situation may be better handled by the semaphored operating environment disclosed in U.S. Provisional Application No. 62/271,003, filed Sep. 10, 2015.

Advantages of the method include the absence of semaphore management and the need for maintaining tokens that allow only one group member at a time access its local memory copy. Such tokens and semaphores, when managing a distributed system, can cause considerable delay even when granted in a "fair" fashion. In the present invention, isolated read requests by random hosts are granted without waiting for a token to make the rounds.

The method is independent of the number of hosts supported by the interconnect as long as there is sufficient memory for allocating the management tables in the hosts and in the interconnect. The method functions across a fabric on interconnected DDMs each of which may support multiple hosts. The destination DDM contains the tables supporting its attached hosts. The grants flow back to the originating host as described and the ACKs are processed by the requesting DDM which passes updates onto local endpoints or to adjacent DDMs as required by routing to reach the various destinations. ACKs are then passed back along the chain of DDMs through which the update passed.

The method disclosed can provide an absolute memory coherency that is stricter that any practically implementable temporal coherency. The method disclosed functions over large systems served by multiple interconnect devices (e.g., DDMs) in an interconnect fabric. The method works with switches and, by way of example, the DDM disclosed here and in U.S. Provisional Application No. 62/216,999, filed Sep. 10, 2015 and U.S. application Ser. No. 15/175,685, filed Jun. 7, 2016 as long as tables are properly allocated and managed and the system supports some sort of control messages for making read requests and grants as well as identifying coherent update demands along with the required acknowledgements.

Definitions

The phrase end-to-end partitioning of message pathways is intended to mean partitioning of the message pathways from a CSME (computing, storage, or network element) to another CSME, for instance a priority channel from a computing element through a host-bus adapter through a data distribution module through another data distribution module then through another host-bus adapter and then to a storage element. The phrase multiple priority levels is intended to mean three or more priority levels, for instance five priority levels including a highest priority channel reserved specifically for fast priority messages and a channel reserved specifically for maintenance functions. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term uniformly is intended to mean unvarying or deviate very little from a given and/or expected value (e.g, within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub) method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

The invention claimed is:

1. A method, comprising operating a data distribution system including a multicast mechanism, and a data distribution module connected between a set of at least two host-bus adapters, wherein each host-bus adapter of the set of host-bus adapters mediates between a host of a set of hosts and the data distribution module, wherein the data distribution system includes a memory-management system including a group memory including a plurality of memory regions located in the data distribution module and each host of the set of hosts including: providing a mirror copy of a memory region of the plurality of memory regions located in the data distribution module to each corresponding memory region of the plurality of memory regions in each host of the set of hosts; initializing a memory-management system that is coherent across the group memory and the plurality of memory regions, wherein the memory-management system does not employ semaphores to maintain coherence; accessing an absolute address of each of the plurality of memory regions by a same offset using tables in the set of at least two host-bus adapters and the data distribution module; and, wherein the multicast mechanism ensures that data packets containing identical copies of relevant information exit the data distribution module in a simultaneous fashion and thereby reach all local host-bus adapters at the same time.

2. The method of claim 1, wherein the plurality of memory regions include heterogeneous memory regions.

3. The method of claim 1, further comprising:
dividing the group memory into a plurality of pages;
providing an entry for each page of the plurality of pages; and,
providing a separate read request and a separate write command for each page of the plurality of pages.

4. The method of claim 1, wherein the memory-management system provides absolute memory coherency across the group memory and the plurality of memory regions.

5. An apparatus, comprising:
a data distribution system including:
a multicast mechanism;
a set of at least two host-bus adapters;
a set of hosts;
a data distribution module connected between the set of at least two host-bus adapters;
wherein each host-bus adapter of the set of host-bus adapters mediates between a host of the set of hosts and the data distribution module;
wherein the data distribution system includes a memory-management system including a group memory including a plurality of memory regions located in the data distribution module and each host of the set of hosts;

wherein a mirror copy of a memory region of the plurality of memory regions located in the data distribution module is provided to each corresponding memory region of the plurality of memory regions in each host of the set of hosts;

wherein the memory-management system is coherent across the group memory and the plurality of memory regions, wherein the memory-management system does not employ semaphores to maintain coherence;

wherein an absolute address of each of the plurality of memory regions accessed by a same offset using tables in the set of at least two host-bus adapters and the data distribution module; and, wherein the multicast mechanism ensures that data packets containing identical copies of relevant information exit the data distribution module in a simultaneous fashion and thereby reach all local host-bus adapters.

6. The apparatus of claim 5, wherein the plurality of memory regions include heterogeneous memory regions.

7. The apparatus of claim 5, further comprising another data distribution module coupled to the data distribution module.

8. The apparatus of claim 5, wherein the memory-management system provides absolute memory coherency across the group memory and the plurality of memory regions.

* * * * *